May 15, 1951 R. THOMAS 2,553,285
APPARATUS FOR REPRODUCING COLORED PICTURES
Filed June 16, 1947 4 Sheets-Sheet 2

Inventor
RICHARD THOMAS,
By
Attorney

May 15, 1951 R. THOMAS 2,553,285
APPARATUS FOR REPRODUCING COLORED PICTURES
Filed June 16, 1947 4 Sheets-Sheet 3

Inventor
RICHARD THOMAS,

Attorney

Inventor
RICHARD THOMAS,
By
Attorney

Patented May 15, 1951

2,553,285

UNITED STATES PATENT OFFICE 2,553,285

APPARATUS FOR REPRODUCING COLORED PICTURES

Richard Thomas, Westwood Village, Calif.

Application June 16, 1947, Serial No. 754,873

1 Claim. (Cl. 88—24)

My invention relates to the art of reproducing pictures in natural colors, and relates to apparatus especially useful in the photographic arts for the photographic reproduction of colored pictures and in the graphic arts for the reproduction of colored pictures by printing the respective colored inks upon a receiving surface by use of a complement of color printing plates.

It is an object of the invention to provide apparatus, wherein with facility and relative economy, a colored object such, for example, as a colored picture, either transluscent or opaque, is photographically separated to color value separations or images, its relative color values are analyzed and corrected or rebalanced, with the result that reproduction of the object or picture are obtained having a color composition as good or better than the color composition of the original object. For example, in the reproduction of a colored scene or picture, it may be desirable to obtain an improvement in the general color effect in the reproductions by subduing one or more colors and increasing the strength or temperature of one or more other colors. In a preferred practice of my present invention, color value separations, also referred to as color value transparencies, are photographically prepared from an original colored object which is placed in the apparatus forming a part of the invention. Positive color value transparencies are thus obtained of the object and in the apparatus these positive color value transparencies are employed to recompose the colored picture by use of colored lights projected simultaneously through the color value transparencies and then passed along a single optical axis and focused on a screen which may be of any selected size within the operating range of the apparatus. The recomposed colored picture may have an area of less than a square inch, or it may be quite large, for example, eleven inches by fourteen inches, in accordance with the size of the reproduction to be made. The color composition of the image now projected onto the screen is now readjusted to give best color effects for the size of the colored image appearing on the screen. For example, in a large colored image a different relative strength or temperature of one or more of the colors may be required than in a small colored image representing the same subject. After obtaining the desired colored composition, the apparatus is then employed to optically print sensitized films or plates to obtain either a photographic reproduction of the original, or for the purpose of preparing color printing plates of the type employed in the graphic arts.

In the graphic arts pertaining to the reproduction of colored pictures in colored inks or pigments, color printing plates are prepared from the separate color value transparencies or color separations, and as a part of the process, whether lithographic, photo-engraving, photo-gelatin, photogravure, intaglio, or offset printing these plates are prepared so as to carry the inks or pigments which combine to produce the colored picture. The strength or density of the color printing plate, that is to say, the ability of the plate to carry the colored ink, depends upon the degree to which certain steps in its preparation are carried. For example, in half-tone photo-engraving, the wider etchings of the lines of the plates result in a reduction in the ink carrying areas of the plates. The things entering into the printing strength or ink carrying capacity of the color printing plates include relative densities of the color value transparencies, the density of light employed in optically printing the color value images from the transparencies onto the sensitized films utilized to control the etching, and the extent of the etching process. The preparation of these printing plates, as now practiced in the graphic arts, involves much time and expense in view of the difficulty in balancing or proportioning the printing strength of the plates so that there will be a proper balance of the color values in the printed reproductions. For example, after the plates have been etched, a trial imprint of the same may show that the reproduction has an excess of one or two of the colors, requiring correction, which involves an expenditure of time and cost to a great extent avoided by use of my present invention.

An object of the invention is to provide apparatus whereby the relative strengths or densities of the colors employed in the composing of the colored image are indicated and these indications or measures of the relative strengths or densities of the colors are employed as directives for determination of other acts to be performed leading to the preparation of the color printing plates. According to my invention, the measures of the color values entering into the composition of the accepted colored image or picture are used by the plate maker first in guiding the selection of light intensity to be employed in the optical printing of the color printing plates and also as indications of the degree to which the etching process is to be carried. By use of the present invention, the extensively employed method of trial and error in the preparation of color printing plates, until acceptable conditions are achieved, is avoided and therefore the time and expense now involved in the preparation of color printing plates are greatly reduced. The simplification and saving accomplished in the graphic arts by my invention will be perceived from the following explanation of its usefulness in half-tone color printing. In this process, sensitized coatings or emulsions carrying the color value image are disposed upon or placed upon the surfaces of the printing plates which are then etched in accordance with the judgment of the etcher. He then takes flat proofs from which to observe the densities of the respective plates and as a general practice, must carefully work over the different plates by re-etching, tooling and burnishing so that when the plates are printed in combination, they will produce the colors in proper proportions. Before this effect is obtained, many proofs and expensive reworking may be necessary. In the applicant's process, the positive color value transparencies of the colored object are prepared, and by simultaneous projection of colored lights through these transparencies and by use of an optical system forming part of the invention, a colored picture is composed upon the screen, and the strengths of the colors employed in composing this picture are varied or adjusted until the desired color composition is obtained. The apparatus has means indicating the strengths of the colors employed in composing the image on the screen and with this knowledge, may prepare new negatives or may replace one or more of the color separation negatives which he has previously prepared, using stronger or weaker lights, or greater or less time of exposure, as may be required, to the end that when the sensitized films used in conjunction with the color printing plates are printed or photographed, these plates with the films or emulsions thereon, may be placed in the etching bath and all given the same etching treatment, the correction for color density having been made at a point along the progress of the process prior to the etching. On the other hand, the operator may in some instances employ unbalanced color value negatives or plate images and vary the time of etching of the respective plates in accordance with information as to light values which he has obtained from the composition of the color image from color value transparencies, as hereinbefore explained. However, it is believed that best results are obtained where the corrections are made prior to the etching, for example, by adjusting the printing light employed in the printing of the sensitized films or emulsions which are employed on the printing plates to control etching. My invention is of especial value for the reason that for judgment of the operator it substitutes the measured values obtained in the use of the image composing device, and therefore much of the previous uncertainty as to the outcome of photographically reproduced or mechanically reproduced pictures is substantially eliminated. Photo-mechanical processes of plate preparation are all based upon the action of light on sensitized materials, some of these processes utilizing in the final state positive color value images while others employ negative color value images. In photo-lithography and in the photo-gelatin process, negatives are prepared, and positive prints from these negatives are photographically impressed on prepared sensitized paper, or a reverse negative may be used to print the image directly on the sensitized surface of the plate. In intaglio color printing, such, for example, as photogravure, the sensitized tissue which is applied to the plate is printed from a positive. I have referred to these various negatives and/or positives employed in the different types of color printing processes by the general term "color value transparency" and from the description contained herein, it will be understood that the measure of color obtained in my apparatus for the guidance of the operator in the steps leading to the final color printing plates, may be employed in determining the strengths or densities of either negative or positive transparencies or of the color value images which are impressed photographically directly on the sensitized films or surfaces of the plates.

In one of its uses, the apparatus forming a part of my present invention constitutes a color temperature meter in conjunction with a viewing device having means to support a complement of color value transparencies in side-by-side relation and focusing means whereby the images from these color value transparencies are superimposed in color on a screen, there being means for measuring the densities of the colors employed in producing the composite colored image on the screen, so that in the reproduction of the original colored object or picture, the selected color composition may be obtained. The valuable features of the invention are employed in both the photo mechanical reproduction of colored pictures and the photographic reproduction of colored pictures in quantity, such reproductions have corrected color balance or composition and therefore in many instances being more acceptable than the original.

It is a further object of the invention to provide a device of the character set forth herein having a novel adjustable projecting lens and light directing means characterized by entire avoidance of parallax which enables the use of the apparatus for a number of valuable functions including the obtaining of accurate color value separations from an original object or color picture, the composing of a colored image of the object or picture from color value transparencies, the optical printing, to any desired size, of multiple emulsion sensitized elements utilized in photographic color picture reproduction, and the optical printing of sensitized elements for use in photo-mechanical reproduction of colored pictures.

It is a further object of the invention to provide apparatus of the character herein set forth wherein the color value images are simultaneously projected onto a single sensitized member by use of light from a common light source so that a photographic negative is obtained having thereon in side-by-side relation a single layer of sensitized and subsequently developed emulsion, color value separations which are produced under identical conditions as to light intensity and exposure, thereby avoiding the unbalanced condition often occurring when the color value images are separately obtained.

A further important advantage of the photographing of the plurality of color value images on a single photographic member is that changes in the relative sizes of the image areas, and the undesirable effects thereof, are substantially avoided. Where, as in customary practice, the color value images are photographed onto separate sensitized films or emulsions, variations in the size of these images may be encountered due to the inconstancy of the effects of the developing, fixing, and washing operations to which such photographic members are separately subjected. In the old practice, referred to in the preceding sentence, labor is expended in compensating for or attempting to compensate for the variations in the sizes of the separately prepared color value images. In the present invention, the plurality of color value images are formed from a single flat sensitized photographic member which is processed as a unit. Accordingly, the color value images are simultaneously processed and are all subjected to the same conditions of treatment, so that changes in area in all of the images are the same. For example, it is generally found that shrinkage occurs in the photographic emulsion, the value of this shrinkage being substantially constant throughout the plurality of color value images, and that these images, while being slightly reduced in area, are moved toward a common center. It is an important object of the invention to provide a simple means in the light directing element of the invention for compensating for the change in image size and placement of the color value images formed on the single sensitized photographic member. This change in color value image size and placement may be cumulative. For example, when the original object is photographed in the device, a color value negative is obtained. This negative must be processed. A color value positive transparency is printed directly from such negative, and when this positive is developed, fixed, washed, and dried, its images will be further reduced in size and spatial separation. In my present invention I provide a simple adjustment whereby the multiplicate optical axes of the light directing means may be readily brought to coincide with the centers of the color value images.

A further object of the invention is to provide in a device of the character described herein effective means for producing light sources which are separately variable, with the lights or lamps arranged so that an equal distribution of the light from each source over the corresponding color value transparency area is obtained.

A further object of the invention is to provide means for controlling the amount of light energy employed for exposure of sensitized elements in both focal planes of the apparatus.

Further objects and advantages of the invention will be brought out in the following part of the specification wherein details have been presented for the purpose of making an ample disclosure of the principles of the invention without imposing limitations on the scope of the appended claim.

Referring to the drawings which are for illustrative purposes only.

Figure 1:
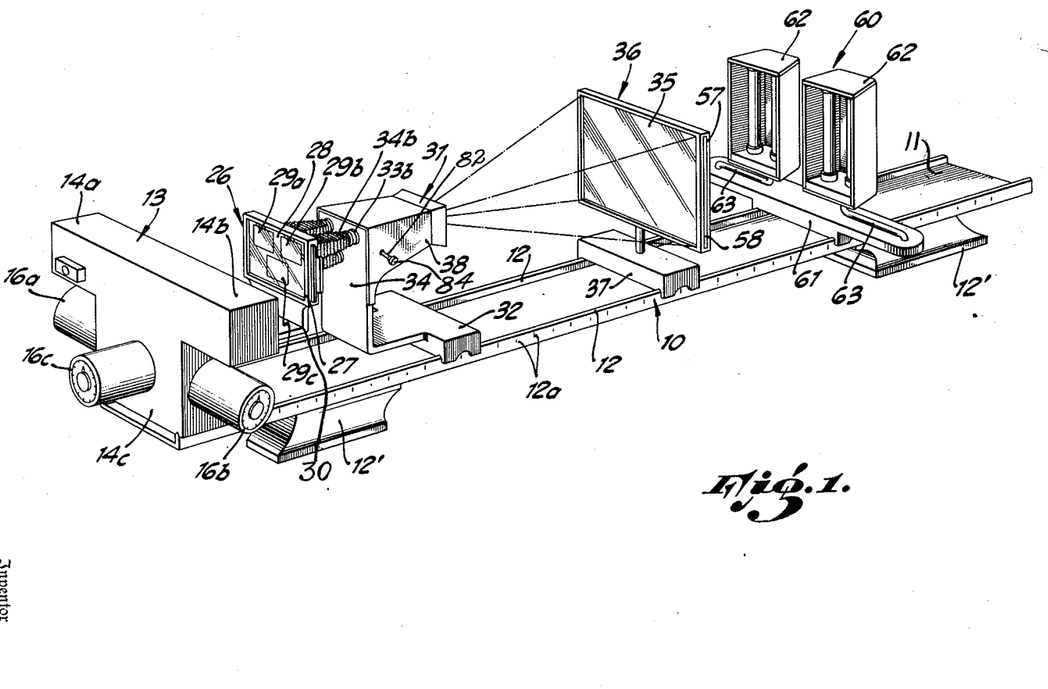
Fig. 1 is a perspective view of a simple embodiment of my invention.

As shown in Fig. 1, the apparatus forming part of the present invention includes a support or bench 10 comprising a longitudinal guide member 11 having the general form of a channel with upstanding parallel flanges to provide tracks 12, along which the component parts of the apparatus may be adjusted. For support of the guide member 11, members, such as legs 12', may be provided.

At the front end of the support 10 there is a light box 13 containing a multiple light source. In the form of the invention disclosed, the light box has a pair of upper sections 14a and 14b and a lower section 14c. In these sections 14a, 14b, and 14c, as shown in the perspective schematic view, Fig. 2, there are lamps 15 respectively designated 15a, 15b and 15c, the illumination outputs of which are determined by rheostats respectively indicated by the numerals 16a, 16b and 16c, and leave the light box 13 through condenser lenses 18a, 18b and 18c respectively. Behind each of the lamps 15 there is a reflector 19. On the side of each lamp 15 opposite from its associated reflector 19 there is a condenser lens 20, these condenser lenses 20 transmitting light respectively from the lamps 15a, 15b and 15c, to diagonal mirrors 21a, 21b and 21c arranged on the axes of the condenser lenses 18a, 18b, and 18c so that rectified light beams from the lamps 15a, 15b and 15c will be reflected out through the condenser lenses 18a, 18b and 18c. In the arrangement shown, the light box 13 is in the form of a letter T and the lenses 18a and 18b are in side by side relation and the lens 18c is placed below the vertical line of division between the lenses 18a and 18b.

Figure 2:
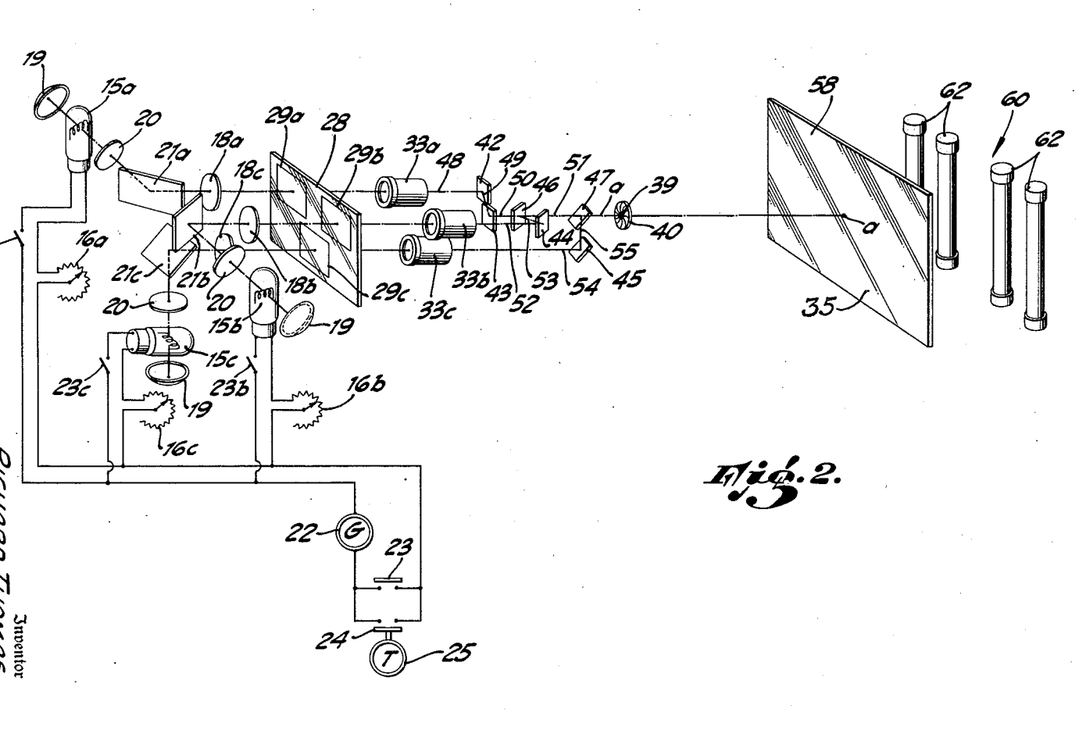
Fig. 2 is a schematic view of the cooperating elements of the device shown in Fig. 1.

The lamps 15a, 15b and 15c are connected in series with the rheostats 16a, 16b and 16c and in parallel with a source of current shown as a generator 22, through a control switch 23. A switch 24, controlled by a timer 25, is connected in parallel relation to the switch 23, this timer controlled switch 24 being utilized when the lamps 15a, 15b and 15c are employed as sources of printing light.

To the right of the light box 13 there is an image separation plate holder 26 of rectangular form having a slot 27 to receive an image separation plate 28 having thereon image areas 29 respectively indicated as 29a, 29b and 29c, these image areas being disposed respectively on the axes of the lenses 18a, 18b and 18c. The holder 26 is shown as being supported by means of a bracket 30 in fixed relation to the light box 13. Beyond or rightwardly of the holder 26 a light directing means 31 is supported by a base 32 which is slidable along the tracks 12 of the bench or support 10. This unit referred to as the light directing means 31 comprises a plurality of objective lenses respectively indicated as lenses 33a, 33b and 33c supported in such position that the projected optical axes of the lenses 33a, 33b and 33c pass respectively through the centers of the image areas 29a, 29b and 29c. The lenses are adapted to establish conjugate focal relation between the focal plane defined by the image separation plate 28 and the focal plane defined by a screen 35 carried in a plate holder 36 referred to herein as the image composition plate holder, which is mounted on a base 37, also slidable along the tracks 12 of the bench 10.

The lenses 33 are contained in a housing 38 having at its rightward end an aperture 39, shown in Fig. 2, this aperture defining a single optical axis *a—a*, which impinges the center of the screen 35. This aperture 39 is provided with a shutter 40 employed in certain uses of the invention, as will be hereinafter described. The lenses 33a, 33b and 33c define three separate light paths aligned with the image areas 29. To bring the light paths defined by the lenses together so that they will coincide with the optical axis *a—a*, a light guiding means 41 is provided in the housing 38 between the lenses and the aperture 39.

Figure 7:
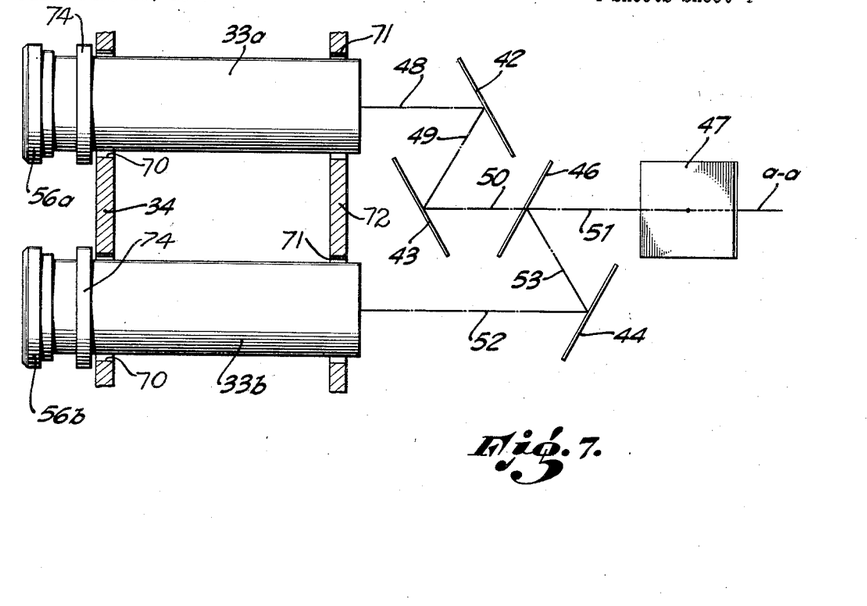
Fig. 7 is a schematic plan view of the light directing means.
Figure 8:
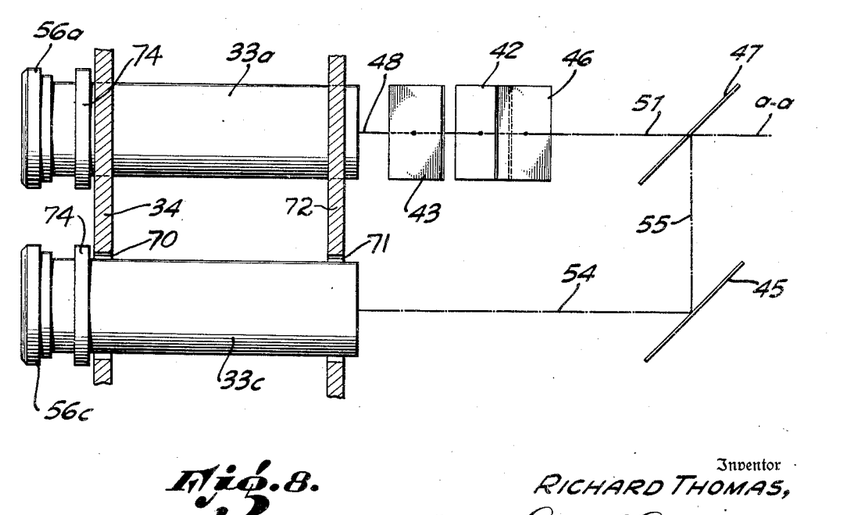
Fig. 8 is a schematic side elevation of the light directing means disclosed in Fig. 7.

As shown in Figs. 2, 7 and 8, the light guiding means 41 includes full reflecting mirrors 42, 43, 44 and 45 and partial mirrors 46 and 47. The mirrors 42, 43, 44, 46 and 47 are disposed in the horizontal plane defined by the lenses 33a and 33b, so that, as shown in Fig. 7, light which will travel rightward through the lens 33a, along the axis 48 thereof will be reflected by the mirror 42 along the axis 49 which will in turn reflect the light along the axis 50, through the partial mirror 46, along the axis 51 and through the partial mirror 47, leaving the partial mirror 47 along the axis *a—a*. Also, as further shown in Fig. 7, the arrangement of the mirrors is such that light which passes through the lens 33b along the axis 52 thereof will be reflected by the mirror 44 along the axis 53 to the mirror 46 which will reflect the light rightwardly along the axis 51 and through the partial mirror 47, and thence along the axis *a—a*. As shown in Figs. 2 and 8, the mirror 45 is disposed below the mirror 47 and on the axis 54 of the lens 33c so as to reflect the light which passes rightwardly through the lens 33c upwardly along the axis 55, so that the light will then be reflected by the mirror 47 rightwardly along the optical axis *a—a*.

It is a feature of this arrangement that the separate images picked up from the image areas 29 by the lenses 33 will be brought together so as to pass along the single optical axis *a—a* and be superimposed on the screen 35 when conjugate focal distances are established between the lenses 33 and the focal planes defined by the image separation plate 28 and the screen 35. Likewise, light from an object, such as a picture, disposed in the position of the screen 35, will pass leftwardly along the axis *a—a* and will be divided by the reflectors of the light guiding means 41 into three separate bundles or three separate paths defined by the axes 48, 52, and 54 of the lenses 33a, 33b and 33c, with the result that three separate images of the object carried in the position of the plate or screen 35 will be projected onto the respective areas 29a, 29b and 29c of the image separation plate 28. If the original object disposed in the position of the screen 35 is in color, color separation images may be formed in the areas 29a, 29b and 29c by disposing suitable filters respectively in crossing relation to the axes 48, 52, and 54. These filters, indicated by the numerals 56a, 56b and 56c, are removably disposed on the front ends of the cylindric holders of the lenses 33a, 33b, and 33c.

The mirrors 45 and 47 are disposed at angles of 45 degrees with respect to the axis 55, as shown in Fig. 8, but the pairs of mirrors 42—43 and 44—46 are not disposed at angles of 45 degrees from the optical axes leading thereto and therefrom, but are arranged so that the optical axes 49 and 53 will be tilted rearwardly as shown in Fig. 7, thereby increasing the length of the paths along which light must travel rightward from the lenses 33a and 33b to the mirror 47 over what they would be if the mirrors 42, 43, 44 and 46 were disposed at angles of 45 degrees to their associated axes and lengths of these light paths into equality with the light path defined by the axes 54 and 55, Fig. 8, along which light travels rightwardly from the lens 33c to the mirror 47.

Figure 3:
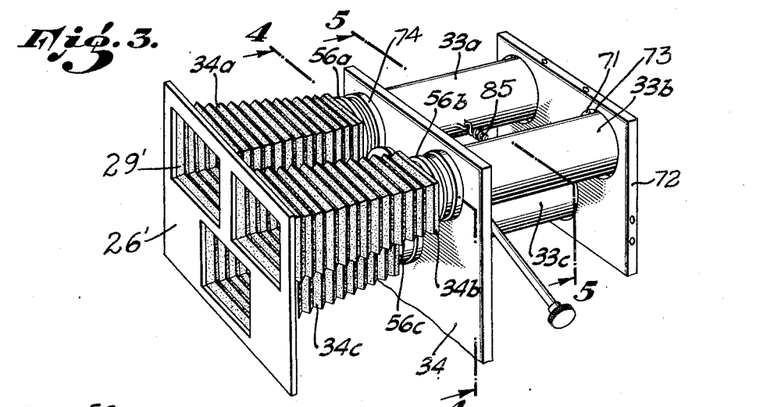
Fig. 3 is a perspective view of fragmentary character disclosing the multiple lens system and the supports therefor.
Figures 4, 5, 6:
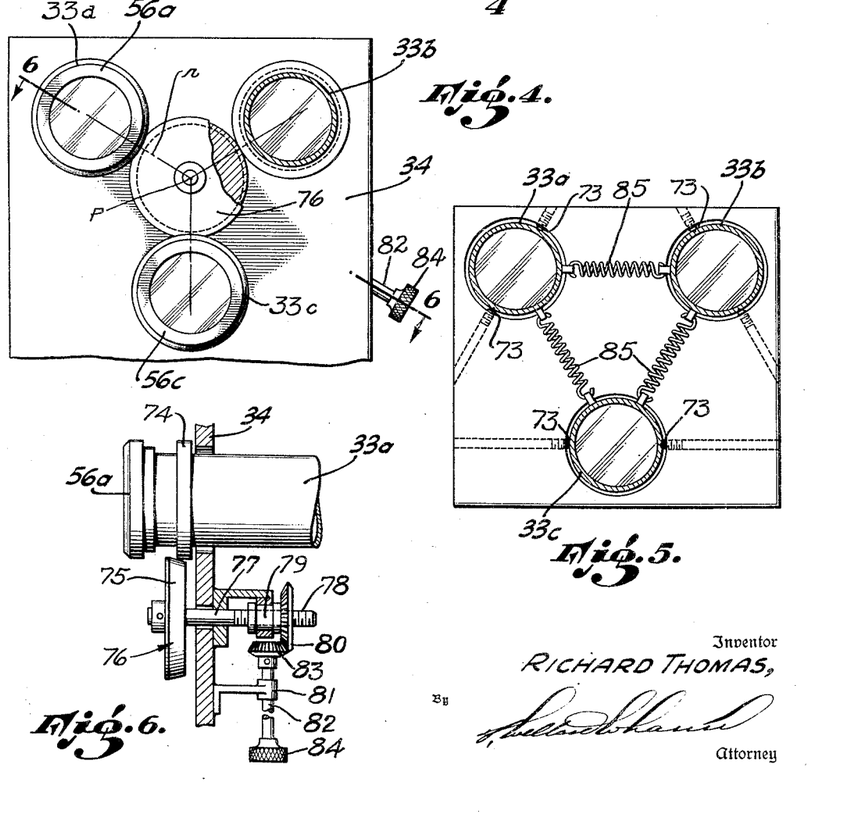
Fig. 4 is an enlarged sectional view taken as indicated by the line 4—4 of Fig. 3.
Fig. 5 is a sectional view taken as indicated by the line 5—5 of Fig. 3.
Fig. 6 is an enlarged fragmentary section taken on the plane indicated by the line 6—6 of Fig. 4.

The focusing lenses 33a, 33b and 33c are disclosed schematically in Fig. 2 in their respective relations to other parts of the device. As hereinbefore explained, these lenses 33a, 33b and 33c are supported within the housing 38 of the light directing means 31, with the forward ends of the lenses projecting through openings 70 in the front wall 34 of the housing 38, as shown in Figs. 1, 3, 4, 6, 7, and 8. To provide adjustability for the lenses 33a, 33b and 33c in lateral direction, the inner ends thereof are supported in openings 71 of a vertical supporting wall 72 disposed within the housing 38 by means of cone-pointed pivot screws 73, best shown in Fig. 5, these pivot screws 73 being arranged so that the leftward or front ends of the lenses 33a, 33b and 33c may be swung along radial lines *r* extending from a center point *p*, Fig. 4, through the respective axes of the lenses 33a, 33b and 33c, this center point *p* being disposed equidistant from the axes of the lenses 33a, 33b and 33c. As shown in Figs. 3, 4, 6, 7, and 8, the cylindric housings of the lenses 33a, 33b and 33c have near the leftward ends thereof collars 74 arranged to engage the conical or sloping peripheral face 75 of an adjusting cam made in the form of a disc 76, as shown in Figs. 4 and 6, this disc 76 being mounted concentrically of the point *p* by a shaft 77 which passes through the wall 34 and has on its inner threaded end 78 an internally threaded nut or sleeve 79 to which a bevel gear 80 is fixed. As shown in Fig. 6, a bracket 81 supports a shaft 82 carrying a pinion 83 which engages the gear 80. The shaft 82 extends to the exterior of the housing 38, as shown in Fig. 1, and has thereon a thumb knob 84 whereby the shaft 82 may be rotated so as to transmit rotation through the gears 83 and 80 to the sleeve 79 so that the shaft 77 and the disc 76 may be moved axially. As shown in Figs. 3 and 5, the lenses 33a, 33b and 33c are connected by springs 85 which act to swing the front or leftward ends of the lenses toward the center point *p* and to hold the collars 74 in engagement with the conical face 75 of the disc 76. Axial movement of the disc 76 produces in and out movement of the leftward or front ends of the lenses 33a, 33b and 33c, thereby providing an adjustment whereby the axes of the lenses 33a, 33b and 33c may be directed to the centers of the image areas 29a, 29b and 29c respectively. The purpose of this adjustment is to compensate for the small shrinkage which may occur in a separation image plate or film during the processing to which it must be subjected.

As shown in Figs. 1 and 3, light shields 34a, 34b and 34c are provided for the light paths which extend from the leftward ends of the lenses 33a, 33b and 33c to the separation image areas 29a, 29b and 29c respectively. These light shields 34a, 34b and 34c are made as bellows so that the lengths thereof may be varied as the light directing means 31 is moved with relation to the plate holder 26 as a part of the focusing function of the device. In Fig. 3, which is a schematic perspective view, I have shown the rightward wall 26' of the plate holder 26. This wall 26' has apertures 29' which correspond to, but are slightly larger than, the image areas 29a, 29b, and 29c. The light shields or bellows 34a, 34b and 34c extend rightwardly from the wall 26' to the leftward ends of the lenses 33a, 33b and 33c.

The plate holder 36, as shown in Fig. 1, has a slot 57 to receive a plate assembly 58. It will be understood that this plate assembly may consist of a masked sensitized film, or may consist of several layers of transparent material, such as glass, between which a colored picture, either translucent or opaque, may be placed so as to support the same in the focal plane defined by the screen 35. The plate holder 36 is made in the manner well known to the photographic art, so that when a plate assembly 58 is moved into the holder 36 through the slot 57, the screen 35 will be forced rearward, and the focal plane of the plate assembly will lie in the plane previously occupied by the front surface of the screen 35, thereby making it possible, after the images occupying the areas 29a, 29b, and 29c are focused on the screen 35, to move a sensitized plate or film member into the plate holder 36 to occupy the position of the screen 35 so as to be exposed to light from the light directing means 31 focused on the focal plane established by the front face of the screen 35.

A second illuminating means 60 is carried by a base 61 adapted to rest upon the tracks 12 of the bench 10, either to the rear of the plate holder 36, as shown in Fig. 1, or between the bases 32 and 37 of the light directing means 31 and the plate holder 36, thereby making it possible to illuminate the plate holder 36, either from the rear or from the front, as may be required by the work at the time being done. The illuminating means 60 comprises a pair of high intensity lamps 62 supported on the base 61 by horizontally disposed levers 63, thereby making it possible to swing the lamps 62 into different positions of adjustment with relation to the object to be illuminated, namely, the plate holder 36 or some other object which is set up on the bench for the purpose of being photographed through the multiple objective means comprising the lenses 33a, 33b, and 33c, in order to obtain color value separations thereof on a sensitized plate disposed in the image separation plate holder 26.

The procedure in using my apparatus for photographic reproduction of color pictures involving revision or correction of color composition is as follows: A colored picture, for example, a transparency which has resulted from the exposure in a camera of a multiple emulsion photographic film, such as a triple emulsion color film, followed by the color processing which is characteristic of the film employed, is placed between two sheets of glass and installed in the plate holder 36. It will be understood that if the color transparency is smaller than the area of the screen 35, as is often the case, the transparency will be surrounded by a mask. The light directing device 31 and the plate holder 36 are then adjusted along the bench 10 so as to focus the image of the picture carried in the plate holder 36 on the areas 29 of the focal plane established in the plate holder 26 by the plate 28. At this time the color filters 56 may be removed from the light paths established by the lenses 33 and a ground glass screen may be inserted in the plate holder 26 so that the results of the focusing operation may be observed. Also, one of the members 12 is provided with calibrations 12a for the setting of the light directing device 31 and the plate holder 36 at proper conjugate focal distances for different image sizes. At this time, the illumination of the transparency is obtained from the lamps 62 which are disposed behind the plate holder 36, as shown in Fig. 1. After the focusing operation just described, the shutter 40 of the light directing device 31 will be closed, and a sensitized photographing plate will be passed into the holder 26 through the slot 27 thereof, in substitution for the ground glass viewing screen used during the focusing operation. It will be understood that the photographic plate is at this time protected from exposure to light by a cover plate or guard. Therefore, the opening of the bellows 34b for the purpose of placing the color filters on the front ends of the lenses 33 will not result in injury to the sensitized emulsion of the plate which has been placed in the holder 26. After closing of the bellows 34a, 34b, 34c, actuation of the shutter 40 will permit passage of light from the transparency carried in the holder 36 to the sensitized photographic plate, and three areas thereon in side by side relation, corresponding to the areas 29a, 29b, and 29c, will be photographed with the color separation images corresponding to the colors of the object transparency carried in the holder 36.

The exposed plate referred to in the preceding paragraph is now developed to produce a color separation negative. This color separation negative is then light printed onto another sensitized plate, or film, so as, by suitable development, to produce a color separation positive having the color separation images in side by side relation. The positive color separation plate thus formed is placed in the plate holder 26, and the transparency is removed from the plate holder 36, leaving in the plate holder 36 the ground glass screen 35. The shutter 40 is opened, and the lamps 15 of the light box 13 are energized as the result of the closing of the switch 23, Fig. 1. The light beams from the lamps 15 will be reflected through the lenses 18 by the reflectors 21 and the lamps 15a, 15b, and 15c will respectively illuminate the image areas of the positive color separation plate corresponding to the areas 29a, 29b, and 29c of the plate 28. Suitable filters will be disposed on the front ends of the lenses 33 and therefore the images of the positive color value separation plate will be projected into superimposed direction onto the screen 35. The light directing means 31 and the frame 36 will be adjusted on the bench 10 so as to produce a desired size of image on the screen 35. Accordingly, the operator may readily increase or decrease the size of the reproduction as compared to the size of the original transparency to be reproduced. Also, the lenses 33a, 33b, and 33c may at this time be adjusted by operation of the knob 84 to compensate for any shrinkage which may have occurred in the separation image plate or film now disposed in the plate holder 26. When the colored image is focused on the screen 35, the rheostats 16 may be adjusted as required to increase or decrease the strength of light and, accordingly the strength of the relative colors passed by the filters which have been installed on the front ends of the lenses 33. In this way, poor color composition in the original may be corrected. After the making of the color adjustments, the light values are observed from the dials of the rheostats 16a, 16b, and 16c, for use in determining light values to be employed in the printing of subsequent photographic members as may be required. The switch 23 is now opened to deenergize the lamps 15 and a triple emulsion sensitized member, such as the triple emulsion film, or a triple emulsion coated paper, is placed in the plate holder 36 so as to occupy the focal plane previously established during the focusing operations by the front face of the screen 35. Then, by setting the timer 25 and closing the switch 24, Fig. 1, the lamps 15 may be energized for a required length of time so that light of proper strength will pass through the positive color value images carried on the single plate disposed in the plate holder 26, and thereby project colored images, determined by the respective color value images of the color value plate onto the triple emulsion sensitized member carried in the frame holder 36, to expose the same to colored light of which the picture to be reproduced is composed, corrected, as hereinbefore explained. The triple emulsion sensitized member is then taken from the frame holder 36 and processed, thereby producing a colored picture corresponding to the original transparency, but having a revised or balanced color composition. With my apparatus, it is possible to obtain reproductions of colored pictures which are improvements over the originals, or identical in color composition to that of the originals. Reproductions made by ordinary methods from transparent colored pictures are often found unsatisfactory due to the loss of color balance in the reproduction. In my arrangement the preparation of color value separations and then the subsequent control of the printing light directed to each positive color value separation has resulted in an important improvement in the art of reproducing colored transparencies.

If the colored picture to be reproduced is not a transparency, but consists of a drawing, water color, or oil painting, etc., disposed on the surface of a sheet such, for example, as a sheet of paper, this colored picture is placed in the holder 36 and the lamps are placed in front of the holder 36, on opposite sides of the optical axis a—a. Then, under front illumination, the procedure which has just been explained with relation to the reproduction of colored transparencies is substantially carried out. That is to say, the colored image of the opaque picture now carried in the holder 36 is projected onto the focal plane of the holder 26 in which a sensitized plate is placed, thereby providing a negative color separation plate, from which a positive color separation plate is prepared. Then, after the color strengths are adjusted and determined, and a sensitized triple emulsion member is placed in the holder 36 and exposed to the colored images in superimposed relation, the sensitized triple emulsion member is then processed so as to produce the colored reproduction.

I have hereinbefore explained how the color separation images may be obtained by use of the device shown in Fig. 1. As an alternative practice, the color value separation may be made from a color value separation negative photographed in a camera, such as disclosed in my copending application, Serial No. 668,731, now Patent No. 2,530,793, issued November 21, 1950.

The invention is of especial value in the production of color printing plates employed in the graphic arts of color picture reproduction. A color separation plate is obtained carrying the color value images of the colored picture which is to be reproduced. This color separation plate may be obtained as previously described, by placing the object in the plate holder 36 and photographing three color value separation images onto a negative plate carried in the holder 26, a positive color separation plate being printed from this negative and developed. As hereinbefore described, the positive color separation plate is placed in the holder 26 and the images thereof are projected in their respective colors onto the screen 35 in superimposed relation to produce a picture in full color, the projection light then being adjusted to give the desired color composition in the image. Then, switches 23a, 23b and 23c are all opened and with a required color separation plate in the holder 26, sensitized plates are, one at a time, properly placed in the holder 36, and by required sequential operation of the switches 23a, 23b and 23c, the color value images are optically printed on the sensitized plates sequentially placed in the holder 36, the respective light intensities employed in this optical printing of the printing plate sensitized emulsions being determined from the dial indications of the rheostats 16a, 16b and 16c. The positive or negative character of the color separation plate employed in the holder 26 for the printing of color printing plate emulsions is determined by the photo mechanical color printing process being followed.

The photographic value of the light employed in the photographing of each color printing plate sensitized surface or emulsion gives the product of light intensity and time. In ordinary practice the time of exposure is the same for each operation of photographing a color value image onto a color printing plate sensitized surface or emulsion, and the variations in degree of exposure are accomplished by adjusting the light sources 15a, 15b, and 15c to the different intensities thereof required to adjust or balance the color printing strengths and/or ink carrying capacities of the color printing plates. The exercise of reasonable care in the carrying out of the procedures described in the foregoing will make possible the preparation of superior color printing plates in a minimum time and with a minimum expenditure of labor owing to the substantial elimination of the need for reworking the color printing plates after they are etched.

As previously explained herein, the setting of the rheostats 16 are indicative of color strengths. The values of these settings are obtained from the dials of the rheostats. After the color plates are etched, they may be individually placed in the holder 36 and light may be reflected from the unetched surfaces thereof back through the light directing means 31, and by the use of a light meter, placed between the leftward ends of the lenses 33 and the plate holder 26, the strengths of light reflected from each of the color printing plates may be noted as a determination of the relative color carrying strengths of the plates.

I claim as my invention:

In a photographic device of the character described, the combination of: a support; a holder on said support for a color separation plate having a plurality of side by side image areas; light directing means on said support on one side of said plate holder for focusing and combining light rays from said image areas into a composite image area in the focal plane of an object area; light producing means on the side of said color separation plate holder opposite from said light directing means for passing separate beams of light through said first image areas, said light producing means comprising a plurality of lamps each offset from the projected axis of a separate one of said first image areas; angularly disposed reflector means for directing the beams of light respectively from said lamps along the axes of said first image areas; means for selectively energizing said lamps to different intensities; and means for controlling the intensity of the beams which are passing through said first image areas from said light producing means to the focal plane of said object area.

RICHARD THOMAS.

REFERENCES CITED

The following references are of record in the file of this patent:

UNITED STATES PATENTS

| Number | Name | Date |
|---|---|---|
| 1,187,844 | Brigden | June 20, 1916 |
| 1,228,877 | Brewster | June 5, 1917 |
| 1,361,012 | Capstaff | Dec. 7, 1920 |
| 1,383,460 | Friese-Greene | July 5, 1921 |
| 1,629,974 | Russo | May 24, 1927 |
| 1,819,541 | Carleton | Aug. 18, 1931 |
| 2,030,795 | Hudeley | Feb. 11, 1936 |
| 2,068,209 | Valentin | Jan. 19, 1937 |
| 2,167,453 | Hillman | July 25, 1939 |
| 2,200,467 | Christiani | May 14, 1940 |
| 2,211,714 | Buckham | Aug. 13, 1940 |
| 2,315,783 | Gilmore | Apr. 6, 1943 |
| 2,317,612 | Huebner | Apr. 27, 1943 |
| 2,352,914 | Rackett | July 4, 1944 |
| 2,372,910 | Pratt | Apr. 3, 1945 |
| 2,402,660 | O'Grady | June 25, 1946 |